United States Patent [19]

Van Doorn et al.

[11] Patent Number: 4,935,396

[45] Date of Patent: Jun. 19, 1990

[54] POLYMERIZATION PROCESS

[75] Inventors: Johannes A. Van Doorn; Johannes J. M. Snel; Nicolaas Meïjboom; Richard L. Wife, all of Amsterdam, Netherlands

[73] Assignee: Shell Oil Company, Houston, Tex.

[21] Appl. No.: 364,778

[22] Filed: Jun. 12, 1989

Related U.S. Application Data

[62] Division of Ser. No. 222,993, Jul. 22, 1988, Pat. No. 4,880,900.

[30] Foreign Application Priority Data

Jul. 23, 1987 [NL] Netherlands .......................... 8701741

[51] Int. Cl.$^5$ .............................................. B01J 31/24
[52] U.S. Cl. ...................................... 502/158; 502/162
[58] Field of Search ................................. 502/158, 162

[56] References Cited

U.S. PATENT DOCUMENTS

| | | | |
|---|---|---|---|
| 2,495,286 | 1/1950 | Brubaker | 260/63 |
| 3,689,460 | 9/1972 | Nozaki | 260/63 |
| 3,694,412 | 9/1972 | Nozaki | 260/63 |
| 4,480,137 | 10/1984 | Oswald et al. | 568/454 |
| 4,831,114 | 5/1989 | Drent | 502/162 X |
| 4,877,861 | 10/1989 | Van Doorn et al. | 502/162 X |

FOREIGN PATENT DOCUMENTS

| | | |
|---|---|---|
| 121965 | 3/1984 | European Pat. Off. . |
| 181014 | 9/1985 | European Pat. Off. . |
| 222454 | 11/1986 | European Pat. Off. . |
| 239145 | 2/1987 | European Pat. Off. . |
| 263564 | 10/1987 | European Pat. Off. . |
| 2511613 | 2/1983 | France . |
| 1081304 | 2/1966 | United Kingdom . |
| 1179242 | 7/1967 | United Kingdom . |
| 1414662 | 2/1972 | United Kingdom . |

OTHER PUBLICATIONS

Elmer C. Alyea et al., "Metal Complexes of Two Potentially Bidentate Silicon–Backbone Phosphine Ligands", Transition, Met. Chem. 10, 435–436 (1985).

*Primary Examiner*—Patrick P. Garvin
*Attorney, Agent, or Firm*—Dean F. Vance

[57] ABSTRACT

In the process of producing a linear alternating polymer of carbon monoxide and at least one ethylenically unsaturated hydrocarbon in the presence of a palladium salt, the anion of a strong non-hydrohalogenic acid, and a phosphine ligand, improved polymerization rates are obtained when employing a novel catalyst composition formed from a novel 1,3-bis(phosphino)-2-silapropane, which can be produced with high yield, wherein the 2-silapropane moiety is additionally substituted at the silicon atom with two hydrocarbyl substituents.

15 Claims, No Drawings

POLYMERIZATION PROCESS

This is a division, of application Ser. No. 222,993, filed Jul. 22, 1988.

FIELD OF THE INVENTION

This invention relates to an improved process for the production of linear alternating polymers of carbon monoxide and at least one ethylenically unsaturated hydrocarbon. More particularly, the invention relates to an improved process wherein the carbon monoxide and hydrocarbon(s) are contacted in the presence of a catalyst composition formed from a palladium salt, the anion of a strong non-hydrohalogenic acid, and a bis(phosphino)-2-silapropane ligand wherein the silicon atom in the 2 position contains two hydrocarbyl substituents.

BACKGROUND OF THE INVENTION

Polymers of carbon monoxide and ethylenically unsaturated hydrocarbons have been known for some time. Brubaker, U.S. Pat. No. 2,495,286, produced such polymers of relatively low carbon monoxide content in the presence of free radical initiators, e.g., peroxy compounds. U.K.1,081,304, discloses the production of similar polymers of higher carbon monoxide content in the presence of alkylphosphine complexes of palladium salts as catalyst. Nozaki extended this reaction to produce linear alternating polymers in the presence of arylphosphine complexes of palladium moieties and certain inert solvents. See, for example, U.S. Pat. Nos. 3,689,460 and 3,694,412.

More recently, the class of linear alternating polymers of carbon monoxide and ethylenically unsaturated hydrocarbons has become of greater interest in part because of the greater availability of the polymers in quantity. Production of this class of polymers, also known as polyketones or polyketone polymers, is illustrated by a number of Published European Applications including 121,965 and 181,014 and by copending U.S. patent application Ser. No. 930,468 filed Nov. 14, 1986. These references illustrate the production of linear alternating polymers of carbon monoxide and ethylenically unsaturated hydrocarbons in the presence of catalyst compositions formed from a compound of palladium, cobalt or nickel, the anion of a non-hydrohalogenic acid having a pKa less than about 6 and a bidentate ligand of phosphorus, arsenic or antimony.

In general, these polymerization catalyst compositions preferably are formed, inter alia, from a bidentate ligand of phosphorus, particularly a bis(phosphino)alkane, and best results are obtained when the catalyst composition is formed from a 1,3-bis(phosphino)propane. Phosphine ligands such as 1,3-bis(diphenylphosphino)propane and 1,3-bis[di(2-methoxyphenyl)phosphino]propane are illustrative of this class of bis(phosphino)propanes. While these catalyst compositions are efficient in catalyzing the production of the linear alternating polymers, it is desirable to provide even more active catalyst compositions. Copending U.S. patent application No. 208,948, filed Jun. 20, 1988 and now U.S. Pat. No. 4,877,861, discloses a more active catalyst composition wherein the phosphine ligand is a 1,3-bis(phosphino)propane having two additional hydrocarbyl substituents at the 2 position of the propane moiety, most preferably 2,2-dimethyl-1,3-bis[di(2-methoxyphenyl)phosphino]propane. However, these phosphino compounds are produced in very low yields by the usual reactions of a 1,3-dihalopropane, substituted on the 2 position, and a substituted phosphide having an alkali metal bonded to the phosphorous atom.

SUMMARY OF THE INVENTION

This invention relates to an improved process of producing linear alternatiung polymers of carbon monoxide and at least one ethylenically unsaturated hydrocarbon, as well as to the catalyst composition employed in such production and to certain novel bis(phosphino)-2-silapropanes employed in the catalyst compositions. More particularly, the invention relates to the production of such linear alternating polymers in the presence of a catalyst composition formed from a palladium salt, the anion of a strong non-hydrohalogenic acid and a bidentate ligand of phosphorous wherein the ligand is a 1,3-bis(phosphino)-2-silapropane in which the 2-silapropane moiety has two additional hydrocarbyl substituents on the silicon atom in the 2 position. Such phosphino ligands can be produced with high yields.

DESCRIPTION OF THE INVENTION

In the process of the invention, linear alternating polymers of carbon monoxide and at least one ethylenically unsaturated hydrocarbon are produced by contacting the carbon monoxide and hydrocarbon(s) in the presence of a catalyst composition formed from a palladium compound, the anion of a non-hydrohalogenic acid having a pKa below about 6 and a bidentate ligand of defined structure.

The palladium compound precursor of the catalyst compositions is the salt of palladium and an acid, organic or inorganic. The palladium salt is preferably a palladium carboxylate, especially the palladium salt of a mono- or dicarboxylic acid. The preferred palladium carboxylates are palladium alkanoates of up to about 10 carbon atoms. While palladium alkanoates such as palladium propionate, palladium butyrate or palladium octanoate are usefully employed in the process of the invention, the preferred palladium alkanoate is palladium acetate.

The anion precursor of the catalyst composition of the invention is the anion of a non-hydrohalogenic acid having a pKa below about 6 and preferably below about 2, as determined in aqueous solution at 18° C. Preferred anions are anions of oxygen-containing acids including anions of inorganic acids such as sulfuric acid, perchloric acid, phosphoric acid and nitrous acid as well as organic acids including sulfonic acids such as p-toluenesulfonic acid, trifluoromethanesulfonic acid, 2-hydroxypropane-2-sulfonic acid and methanesulfonic acid and carboxylic acids in such as trifluoroacetic acid, trichloroacetic acid, dichloroacetic acid, difluoroacetic acid, tartaric acid and 2,5-dihydroxybenzoic acid. Trifluoroacetic acid and p-toluenesulfonic acid comprise a preferred class of acids whose anions are suitable in the process of the present invention, particularly trifluoroacetic acid. The anion is employed in a quantity from about 0.5 equivalent to about 200 equivalents per gram-atom of palladium (as the compound), preferably from about 1 equivalent to about 100 equivalents of the anion per gram atom of palladium.

The anion is preferably provided as the acid, but in alternate modifications the anion is provided in the form of a salt. When a salt is employed to provide the anion, non-noble transition metal salts, i.e., salts of metals of Groups IIIB–VIIB of the Periodic Table of Elements, are usefully employed. Particularly suitable salts include those salts of copper, zirconium and vanadium. In the modifications where the anion is provided as a nonnoble transition metal salt, copper salts are preferred. In yet another modification, it is suitable to provide the palladium and the anion as a single compound. e.g., the palladium p-toluenesulfonate acetonitrile complex formed by reacting palladium chloride with silver p-toluenesulfonate in acetonitrile.

The bidentate phosphorus ligand employed as precursor of the catalyst composition of the invention is a 1,3-bis(diarylphosphino)-2-silapropane wherein the 2-silapropane moiety (—CH₂—SiH₂—CH₂—) is substituted at the silicon atom with two hydrocarbyl substituents. A preferred class of such bidentate phosphorus ligands are represented by the formula

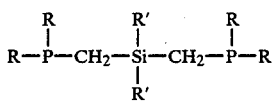

wherein R independently is monovalent aryl of from 6 to 20 carbon atoms inclusive and is hydrocarbyl aryl group or is a substituted hydrocarbyl group wherein any non-hydrocarbyl substituents are polar substituents, particular alkoxy. Illustrative of suitable R groups are phenyl, naphthyl, tolyl, 2,4-dimethylphenyl, 2-methoxyphenyl, 2-ethoxynaphthyl, 3-propoxyphenyl, 2-methyl-4-methoxyphenyl, 2,4-dimethoxyphenyl and 2-propoxyphenyl. R' independently is a hydrocarbyl group of up to 10 carbon atoms and is an alkyl group such as methyl, ethyl, hexyl or decyl, or is aryl including alkaryl such as phenyl, naphthyl, tolyl or xylyl. Preferred R' groups are alkyl, particularly methyl. The R groups are the same or are different but preferably are the same. For best results at least one but preferably each R group is phenyl substituted with a polar substituent, particularly alkoxy, in a position ortho to the phosphorus, i.e., a 2-alkoxyphenyl substituent.

The most preferred bidentate phosphorus ligands are 2,2-dimethyl-1,3-bis[di(2-methoxyphenyl)phosphino]-2-silapropane; and 2,2-dimethyl-1,3-bis(diphenylphosphino)-2-silapropane and particularly preferred is 2,2-dimethyl-1,3-bis[di(2-methoxyphenyl)phosphino]-2-silapropane. The bidentate phosphorus ligands are suitably employed in a quantity of from about 0.1 mol to about 3 mol per mol of palladium compound, preferably in a quantity from about 0.75 mol to about 2 mol of palladium compound.

Compounds of the general formula

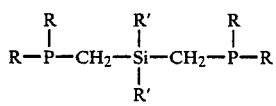

can be prepared by reaction of a compound of the general formula

with a compound of the general formula

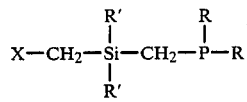

wherein Y is an alkali metal atom, X is a halogen atom, and R and R' are as previously defined. The preferred phosphine ligands can be prepared by the reaction of the alkali metal phosphide of the general formula

with a substituted dihalo 2-silopropane of the general formula

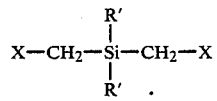

wherein each R is individually selected from a group consisting of 2-methoxy phenol and diphenyl, most preferably each R is 2-methoxyphenyl, and each R' is preferably methyl.

The activity of the catalyst composition is enhanced on occasion by the additional incorporation into the catalyst composition of a quinone. A variety of quinones are suitably employed as optional catalyst composition enhancers, including benzoquinone, naphthoquinone and anthraquinone. I general, when a quinone is employed, 1,4-quinones are preferred and particularly preferred is 1,4-benzoquinone. The use of a quinone is not required, but when a quinone is employed quantities of quinone up to 1000 mol of quinone per gram atom of palladium are useful, particularly amounts of quinone from about 25 mol to about 250 mol per gram atom of palladium.

The polymerization process comprises contacting the catalyst composition with carbon monoxide and at least one ethylenically unsaturated hydrocarbon. Suitable ethylenically unsaturated hydrocarbons have up to 20 carbon atoms inclusive, preferably up to 10 carbon atoms, and are aliphatic including ethylene and other alpha-olefins such as propylene, butylene, isobutylene, 1-hexene, 1-octene and 1-dodecene, or are arylaliphatic having an aryl substituent on a carbon atom of the ethylenic unsaturation, e.g., styrene, m-propylstyrene, p-methylstyrene and p-ethylstyrene. The members of the class of alpha-olefins are preferred as precursors of the linear alternating polymers. Preferred polymers are copolymers of carbon monoxide and ethylene or terpolymers of carbon monoxide, ethylene and propylene.

The polymers of the invention are linear alternating polymers having substantially one mole of carbon monoxide for each mole of hydrocarbon. When copolymers are desired, the total quantity of hydrocarbon will consist of a single ethylenically unsaturated hydrocarbon but when terpolymers are desired, the molar ratio of a first hydrocarbon, preferably ethylene, to the second hydrocarbon will be from about 1:1 to about 400:1, preferably from about 10:1 to about 100:1.

The catalyst composition is provided in a catalytic quantity. Suitable quantities of catalyst composition are those which provide from about $1 \times 10^{-7}$ to about $1 \times 10^3$ gram atom of palladium per mol of ethylenically unsaturated hydrocarbon, preferably from about $1 \times 10^{-6}$ to about $1 \times 10^{-4}$ gram atom of palladium per mole of unsaturated hydrocarbon. The molar ratio of ethylenically unsaturated hydrocarbon to carbon monoxide is from about 10:1 to about 1.5, preferably from about 5:1 to about 1:2.

Polymerization is conducted under polymerization conditions in the liquid phase in the presence of an inert reaction diluent such as a lower alkanol, e.g., methanol or ethanol. The method of contacting the reactants and the catalyst composition is not critical and contact is maintained by conventional methods such as stirring or shaking. Typical reaction temperatures are from about 20° C. to about 200° C. and preferably are from about 30° C. to 150° C. Typical reaction pressures are from about 1 bar to about 200 bar, but more often are from about 20 bar to about 100 bar. Subsequent to reaction, the polymer product is recovered by conventional methods such as filtration or decantation. The polymer product will on occasion contain residues of the catalyst composition which are removed, if desired, by treatment with a solvent or a complexing agent which is selective for the residues.

Of particular interest are the polymers having a molecular weight from about 1,000 to about 200,000, but preferably from about 10,000 to about 50,000. Such polymers typically have a melting point from about 175° C. to about 300° C. and a limiting viscosity number (LVN), measured in a standard capillary viscosity measuring device in m-cresol at 60° C., of from about 0.5 to about 10.

The polymer products are known materials of established utility as premium thermoplastics. By way of illustration, the polymers are processed by known methods such as extrusion or injection molding into sheets, films, plates and shaped articles which are useful in the packaging industry and in the production of containers such as for food and drink. The polymers find additional application in the production of both internal and external parts for automotive applications.

The invention is further illustrated by the following Comparative Examples (not of the invention) and the following Illustrative Embodiments. In each of the Comparative Examples and Illustrative Embodiments, the copolymer products had a melting point of 257° C. For each of the copolymers, the $^{13}$C-NMR analysis was consistent with a linear alternating structure and confirmed that the copolymer comprised units of the repeating formula —CO—(CH$_2$—CH$_2$)—.

COMPARATIVE EXAMPLE 1

For comparison, 1,3-bis[di(2-methoxyphenyl)phosphino]propane was prepared as follows. To 250 ml of liquid ammonia in a stirred reaction vessel which was kept at −78° C. by cooling, were successively added 35 mmol of sodium, 17.5 mmol of tri(2-methoxy-phenyl) phosphine and 25 ml of tetrahydrofuran. After 6 hours, 8.75 mmol of ammonium chloride was added to the reaction mixture, followed after 15 minutes by 8.75 mmol of 1,3-dichloro propane. After 100 ml of tetrahydrofuran was added, ammonia was evaporated away and the residue was refluxed for another hour. After the solvent was removed in vacuo, dichloro methane and an aqueous solution of ammonium chloride were added to the residue. The organic layer was separated off, dried and filtered. Finally, the solvent was removed. From analysis of the residue it became apparent that the 1,3-bis[di(2-methoxy-phenyl)phosphino]propane had been obtained in quantitative yield, calculated on the quantity of 1,3-dichloro propane used.

COMPARATIVE EXAMPLE 2

For comparison, 2,2-dimethyl-1,3-bis[di(2-methoxyphenyl)phosphino]propane was prepared substantially in the same way as the 1,3-bis[di(2-methoxyphenyl)phosphino]propane of Example 1, except for the following differences
(a) to the liquid ammonia were successively added 30 mmol of sodium, 15 mmol of tri(2-methoxy-phenyl)phosphine and 100 ml of tetrahydrofuran,
(b) to the reaction mixture were added 7.5 mmol of ammonium chloride and 7.5 mmol of 1,3-dichloro-2,2-dimethylpropane, and
(c) after evaporation of ammonia, the residue was refluxed for another seven hours.

From analysis of the residue it became apparent that the 2,2-dimethyl-1,3-bis[di(2-methoxypheny)phosphino]propane had been obtained in a yield of 11%, calculated on the quantity of 1,3-dichloro-2,2-dimethyl propane used.

EXAMPLE 3

To demonstrate the present invention, 2,2-dimethyl-1,3-bis[di(2-methoxyphenyl)phosphino]-2-silapropane was prepared substantially in the same way as the 1,3-bis[di(2-methoxyphenyl)phosphino]propane of Example 1, except for the following differences
(a) to 275 ml of liquid ammonia were successively added 58.7 mmol of sodium, 29.35 mmol of tri(2-methoxyphenyl)phosphino and 50 ml of tetrahydrofuran,
(b) to the reaction mixture were added 29.35 mmol of ammonium chloride and 14.68 mmol of 1,3-dichloro-2,2-dimethyl-2-silapropane, and after evaporation of ammonia, the residue was refluxed for another 30 minutes.

From analysis of the residue it became apparent that the 2,2-dimethyl-1,3-bis[di(2-methoxyphenyl)phosphino]-2-silapropane had been obtained in a yield of 85%, calculated on the quantity of 1,3-dichloro-2,2-dimethyl-2-silapropane used. Crystallization afforded the pure disphosphine in a yield of 80%, calculated on the quantity of dichloro compound used.

EXAMPLE 4

To further demonstrate the present invention, 2,2-dimethyl-1,3-bis(diphenyphosphino)-2-silapropane was prepared substantially in the same way as the 1,3-bis[di(2-methoxyphenyl)phosphino]propane of Example 1, except for the following differences
(a) to 1 l of liquid ammonia were successively added 7.1 g of sodium and 40 g of triphenyl phosphine; no tetrahydrofuran was added, and
(b) 8.15 g of ammonim chloride and 11.9 g of 1,3-dichloro-2,2-dimethyl-2-silapropane were added to the reaction mixture.

From analysis of the residue it became apparent that the 2,2-dimethyl-1,3-bis(diphenylphosphino)-2-silapropane had been obtained in a yield of 95%, calculated on the quantity of 1,3-dichloro-2,2-dimethyl-2-silapropane used. Crystallization afforded the pure diphosphine in a yield of 91%, calculated on the quantity of dichloro compound used.

COMPARATIVE EXAMPLE 5

For comparison, 2,2-dimethyl-1,3-bis(dicyclohexylphosphino)propane was prepared by the reaction in tetrahydrofuran of lithium dicyclohexyl phosphide with 1,3-dichloro-2,2-dimethylpropane. The yield was about 20%, calculated on the quantity of dichloro compound used.

COMPARATIVE EXAMPLE 6

For comparison, 2,2-dimethyl-1-diphenyl-phosphino-3-di(2-methoxyphenyl)phosphinopropane was prepared by the reaction in tetrahydrofuran of sodium di(2-methoxy-phenyl)phosphide with 1-chloro-3-diphenyl-phosphino-2,2-dimethyl propane. The yield was about 15%, calculated on the quantity of chloro compound used.

COMPARATIVE EXAMPLE 7

A carbon monoxide/ethene copolymer was prepared for comparison to the present invention as follows. A mechanically stirred autoclave of 300 ml capacity was charged with 200 ml of methanol. The air present in the autoclave was expelled therefrom by pressurizing the autoclave with carbon monoxide until a pressure of 50 bar was reached and then releasing the pressure and repeating this procedure twice over. After the contents of the autoclave had been brought to a temperature of 97° C., a 1:1 carbon monoxide/ethene mixture was introduced until a pressure of 55 bar was reached. A catalyst solution was then introduced into the autoclave, consisting of:
6 ml of methanol,
0.02 mmol of palladium acetate,
0.04 mmol of trifluoro acetic acid,
0.02 mmol of the 1,3-bis[di-(2-methoxyphenyl)phosphino]propane of Comparative Example 1, and
4 mmol of 1,4-benzoquinone.

The pressure was maintained at 55 bar by introducing a 1:1 carbon monoxide/ethene mixture. After 3 hours the polymerization was terminated by cooling the reaction mixture down to room temperature and releasing the pressure. The copolymer was filtered off, washed with methanol and dried at 70° C.

Thus, a copolymer having an LVN of 1.0 dl/g was prepared at a polymerization rate of 12.2 kg copolymer/g palladium/hour.

COMPARATIVE EXAMPLE 8

A carbon monoxide/ethene copolymer was prepared for comparison to the present invention substantially in the same way as the copolymer of Comparative Example 7, except that instead of the 1,3-bis[di(2-methoxyphenyl)phosphino]propane, the 2,2-dimethyl-1,3-bis[-di(2-methoxyphenyl)phosphino]propane of Comparative Example 2 was used.

Thus a copolymer having an LVN of 0.9 dl/g was prepared at a polymerization rate of 20.0 kg copolymer/g palladium/hour.

EXAMPLE 9

A carbon monoxide/ethene copolymer was prepared to illustrate the present invention substantially in the same way as the copolymer of Example 7, except for the following differences:
(a) the polymerization temperature was 89° C. instead of 97° C., and
(b) the component (c) used was the 2,2-dimethyl-1,3-bis[[di(2-methoxyphenyl)phosphino]-2-silapropane of Example 3 instead of 1,3-bis[di(2-methoxyphenyl)-phosphino]propane.

Thus, a copolymer having an LVN of 1.0 dl/g was prepared at a polymerization rate of 19.0 kg copolymer/g palladium/hour.

Examples 3, 4 and 9 of Examples 1–9 are examples according to the present invention. Examples 3 and 4 describe the preparation of the preferred phosphine ligands. Example 9 describes a polymer preparation by using the most preferred catalyst composition of the present invention. Comparative Example 1, 2 and 5–8 are outside the scope of the invention. They have been included in the patent application for comparison.

With the aid of $^{13}$C-NMR analysis it was established that the carbon monoxide/ethene copolymers prepared according to Examples 7–9 had an alternating structure and consisted therefore of units of the formula —(-CO)—($C_2H_4$)—. Comparison of Comparative Example 1 (quantitative yield) with Comparative Example 2 (11% yield) demonstrates the considerable decrease in diphosphine yield which results from replacing a compound X—$CH_2$—$CH_2$—$CH_2$—X with a compound X—$CH_2$—$C(CH_3)_2$—$CH_2$—X as the dihalo compound in the diphosphine synthesis. Comparison of Comparative Example 2 (11% yield) with Example 3 (85% yield) demonstrates the marked increase in diphosphine yield which results from replacing a compound X—$CH_2$—$C(CH_3)_2$—$CH_2$—X with a compound X—$CH_2$$Si(CH_3)_2$—$CH_2$—X as the dihalo compound in the diphosphine synthesis. Like Example 3, Example 4 demonstrates that diphosphines in which the central atom of the bridging group contains two substituents can be prepared in high yield if the central atom is a silicon atom. Comparative Examples 5 and 6 (20 and 15% yield, respectively) further demonstrate that in the preparation of diphosphines in which the central carbon atom of the bridging group contains two substituents yields are low.

The advantages of using a substituted 2-propane diphosphine in the catalyst compositions is demonstrated by the comparison of Comparative Examples 7 and 8. In both instances the polymers formed have about similar molecular weights; however, when the 2,2-dimethyl-substituted diphosphine is used in Comparative Example 8, the polymerization rate obtained is much higher.

Comparative Example 8 and Example 9 show that with respect to the performance of the catalyst composition it is irrelevant whether the catalyst composition uses a substituted 2-propane diphosphine or a substituted 2-silapropane diphosphine of the present invention. In both instances, polymers of about similar molecular weights are prepared at about similar polymerization rates.

What is claimed is:
1. A catalyst composition formed from a palladium salt, the anion of a non-hydrohalogenic acid having a pKa less than about 6 and a bidentate phosphorus ligand of the formula

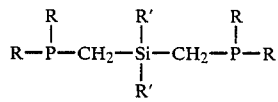

wherein R independently is monovalent aryl from 6 to 20 carbon atoms inclusive and R' independently is hydrocarbyl of up to 10 carbon atoms.

2. The composition of claim 1 wherein each R' is alkyl.

3. The composition of claim 2 wherein each R is phenyl.

4. The composition of claim 3 wherein each R is 2-alkoxyphenyl.

5. The composition of claim 4 wherein each R' is methyl.

6. The composition of claim 5 wherein each 2-alkoxyphenyl is 2-methoxyphenyl.

7. The composition of claim 1 wherein the palladium salt is palladium carboxylate, the anion is the anion of trifluoroacetic acid or p-toluenesulfonic acid, each R' is methyl and each R is 2-alkoxyphenyl.

8. The composition of claim 7 wherein the palladium carboxylate is palladium acetate, the anion is the anion of trifluoroacetic acid and each R is 2-methoxyphenyl.

9. The composition of claim 1 wherein said non-hydrohalgenic acid is an organic acid.

10. The composition of claim 1 wherein said non-hydrohalogenic acid is an organic acid.

11. The composition of claim 10 wherein said organic acid is a carboxylic acid.

12. The composition of claim 1 wherein said non-hydrohalogenic acid is trifluoroacetic acid or p-toluenesulfonic acid.

13. The composition of claim 1 wherein said non-hydrohalogenic acid is trifluoroacetic acid.

14. The composition of claim 1 wherein said palladium salt is a palladium carboxylate of up to 10 carbon atoms.

15. The composition of claim 14 wherein said palladium carboxylate is palladium acetate.

* * * * *